(12) United States Patent
Kirihara et al.

(10) Patent No.: US 8,708,877 B2
(45) Date of Patent: Apr. 29, 2014

(54) DRUM ROTATING DEVICE

(75) Inventors: Takeshi Kirihara, Kiryu (JP); Takashi Ando, Kiryu (JP); Isao Miki, Himeji (JP); Yoshikazu Mitsusada, Himeji (JP)

(73) Assignees: Nidec Servo Corporation, Gumma (JP); Glory Ltd., Hyogo (JP)

( * ) Notice: Subject to any disclaimer, the term of this patent is extended or adjusted under 35 U.S.C. 154(b) by 615 days.

(21) Appl. No.: 12/887,662

(22) Filed: Sep. 22, 2010

(65) Prior Publication Data
US 2011/0086748 A1    Apr. 14, 2011

(30) Foreign Application Priority Data
Oct. 8, 2009 (JP) ................................. 2009-234208

(51) Int. Cl.
*F16C 13/00* (2006.01)
(52) U.S. Cl.
USPC .................................. 492/15; 492/46; 492/60
(58) Field of Classification Search
USPC ................................................. 492/15, 47, 60
See application file for complete search history.

(56) References Cited

U.S. PATENT DOCUMENTS

| | | | | |
|---|---|---|---|---|
| 2,758,527 A * | 8/1956 | McFadden | ..................... | 396/456 |
| 2,885,579 A * | 5/1959 | Lemp | ............................ | 310/120 |
| 7,299,915 B2 * | 11/2007 | El-Ibiary | ...................... | 198/788 |
| 7,662,079 B2 * | 2/2010 | Yamamoto et al. | ............. | 492/47 |

FOREIGN PATENT DOCUMENTS

| | | |
|---|---|---|
| JP | 63-139372 A | 6/1988 |
| JP | 05-086787 A | 4/1993 |
| JP | 07-020087 Y2 | 5/1995 |
| JP | 10-304618 A | 11/1998 |
| JP | 11-336453 A | 12/1999 |
| WO | 2006/040747 A1 | 4/2006 |

OTHER PUBLICATIONS

Machine Translation of JP11336453A (English Abstract filed in Applicant's IDS on Sep. 22, 2010).*
Machine Translation of JP10304618A (English Abstract filed in Applicant's IDS on Sep. 18, 2012).*
Official Communication issued in corresponding Chinese Patent Application No. 201010503594, mailed on Aug. 3, 2012.
Official Communication issued in corresponding Japanese Patent Application No. 2009-234208, mailed on Jun. 26, 2013.

* cited by examiner

*Primary Examiner* — Sarang Afzali
(74) *Attorney, Agent, or Firm* — Keating & Bennett, LLP

(57) ABSTRACT

A drum rotating device enables a drum and a driving device mounted in the drum to be supported with a simple structure and which reduces the possibility that the driving shaft of the driving device may be offset with respect to the rotation axis of the drum. The drum rotation device includes the drum and the driving device arranged to drive and rotate the drum. The drum includes an outer cylinder, an inner cylinder arranged inside the outer cylinder coaxially therewith, and a support wall arranged to connect the outer and inner cylinders to each other at an approximately intermediate portion in the axial direction. The outer and inner cylinders are substantially cylindrical. The driving device is fixed to a frame at one axial end. The driving shaft of the driving device extends through the drum and is rotatably supported by the frame through a bearing at the other axial end. The driving shaft is arranged to extend through the inner cylinder, thereby being fixedly attached the drum so that the drum and the driving shaft can rotate together.

2 Claims, 4 Drawing Sheets

DRUM ROTATING DEVICE

BACKGROUND OF THE INVENTION

1. Field of the Invention

The present invention relates to a drum rotating device which is arranged to rotate a drum with a motor mounted in the drum.

2. Description of the Related Art

Devices for rotating a cylindrical drum with a motor mounted in the drum in order to improve the space efficiency are known in the art. As examples of a conventional drum rotating device, JP 5086787 (A) discloses a device for raising/lowering a roller shade and JP 11336453 (A) discloses a shutter device. Both of these are drum rotating devices using a driving device mounted in the drum for rotating the drum. The driving devices include a motor and a decelerator for decelerating the rotating output of the motor. The output shaft of the decelerator is linked to the drum to rotate the drum. The drum rotating devices also include a supporting arrangement, such as a bracket, for supporting the driving device at a nearby fixed portion, and other supporting arrangements on both sides of the drum for supporting the drum itself to be freely rotatable relative to the fixed portion.

Yet another exemplary conventional drum rotating device is disclosed in JP 2008517576 (T), which includes a driving device placed in a guide roller fixed to a frame. The driving device includes a motor and a transmission portion. The driving shaft of the transmission portion is linked to a drum arranged about the outer periphery of the guide roller. The drum is held on the outer periphery of the guide roller coaxially therewith a circular arc guide block fixed to the inner wall of the drum. The drum is rotated relative to the guide roller by sliding movement of the guide block on the outer peripheral surface of the guide roller.

The drum rotating devices disclosed in JP 5086787 (A) and JP 11336453 (A), however, have a complicated structure because supporting arrangements are separately provided, one of which supports the driving device mounted in the drum and the other that supports the drum such that the drum can rotate. Moreover, the center of rotation of the drum may be located offset with respect to the center of the output shaft of the decelerator rather than in line with the center of the output shaft. If they are offset relative to each other, the drum cannot be rotated stably.

In the drum rotating device of JP 2008517576 (T), one end of the drum is arranged to slide on the outer periphery of the guide roller within which the motor is mounted, thereby ensuring coaxiality. However, the other end of the drum is supported at its shaft by another frame. Therefore, in a case of low positional accuracy of the drum shaft at the other end, the axis of rotation of the drum may be offset with respect to the driving shaft rather than in line with the center of the output shaft to thereby cause an unstable rotation of the drum.

SUMMARY OF THE INVENTION

Preferred embodiments of the present invention provide a drum rotating device which enables a drum and a driving device mounted in the drum to be supported by a simple structure which is less likely to cause the rotation axis of the drum and the driving shaft of the driving device to be offset with respect to each other.

According to a preferred embodiment of the present invention, a drum rotating device includes a drum and a driving device mounted in the drum. The driving device includes a motor arranged to rotate the drum and a driving shaft arranged to extend through the drum in an axial direction of the drum. The driving device is fixed to a frame at one end of the drum in the axial direction, and the driving shaft of the driving device is rotatably supported by the frame via a bearing. The drum is fixedly attached to the driving shaft to be rotatable together with the driving shaft.

It is preferable that the driving device includes a decelerator arranged to decelerate the rotation of the motor and to transmit this decelerated rotation to the driving shaft, and a rotation shaft of the motor and the driving shaft are arranged to be coaxial with each other.

It is preferable that the rotation shaft of the motor is arranged to extend in the axial direction and project through the frame at one axial end to the outside to be connected to the decelerator at another axial end.

It is preferable that the drum includes an outer cylinder, an inner cylinder arranged inside the outer cylinder coaxially therewith, and a support wall connecting the outer and inner cylinders to each other at an approximately intermediate portion in the axial direction. It is also preferable that the outer and inner cylinders are substantially cylindrical, and the driving shaft is arranged to extend through the inner cylinder to be fixedly attached to the drum.

According to another preferred embodiment of the present invention, a drum rotating device includes a drum arranged between a pair of opposite frame sidewalls, and a driving device including a motor arranged to drive and rotate the drum and mounted in the drum. The driving device is fixed to one of the frame sidewalls at one end in an axial direction of the drum. A driving shaft of the driving device is arranged to extend through the drum to project to an outside of the drum, and a projected portion of the driving shaft is rotatably supported on the other of the frame sidewalls via a bearing. The drum is fixedly attached to the driving shaft to be rotatable together with the driving shaft.

In the drum rotating device according to a preferred embodiment of the present invention, the driving device is fixed to a frame at one end, while the driving shaft of the driving device is rotatably supported by the frame. The drum is fixedly attached to the driving shaft. Thus, it is unnecessary to provide a unique support arrangement arranged to support the drum with the frame, and both the drum and the driving device can be supported with a simple structure. Moreover, since the drum is fixedly attached to the driving shaft of the driving device, it is less likely that the driving shaft is offset with respect to the rotation axis of the drum. Thus, the drum can be rotated stably.

In addition, the decelerator is preferably included in the driving device such that the drum can be rotated with a small-torque motor. Moreover, the rotation axis of the motor and the driving shaft are coaxial with each other in the preferred embodiment of the present invention. Therefore, the rotation axes of the motor and the drum can be made coincident with each other, resulting in effective use of the space within the drum.

Further, the rotation shaft is arranged to project to the outside at one end. Thus, the power of the motor can also be used for purposes other than rotating the drum, and the space can be more effectively used than in a case where another motor is separately placed in the outside.

In a case where the drum is defined by the inner cylinder, the outer cylinder, and the support wall and the driving shaft is arranged to extend through the inner cylinder and to be fixedly attached thereto, displacement of the drum with respect to the driving shaft can be prevented even if the support wall is shifted from the drum center in order to allow the driving device to be mounted within the drum. Therefore, stable connection can be made and maintained.

The above and other elements, features, steps, characteristics and advantages of the present invention will become more apparent from the following detailed description of the preferred embodiments of the present invention with reference to the attached drawings.

DETAILED DESCRIPTION OF PREFERRED EMBODIMENTS

Drum rotating devices according to preferred embodiments of the present invention are described below with reference to the drawings.

First Preferred Embodiment

Figure 1:
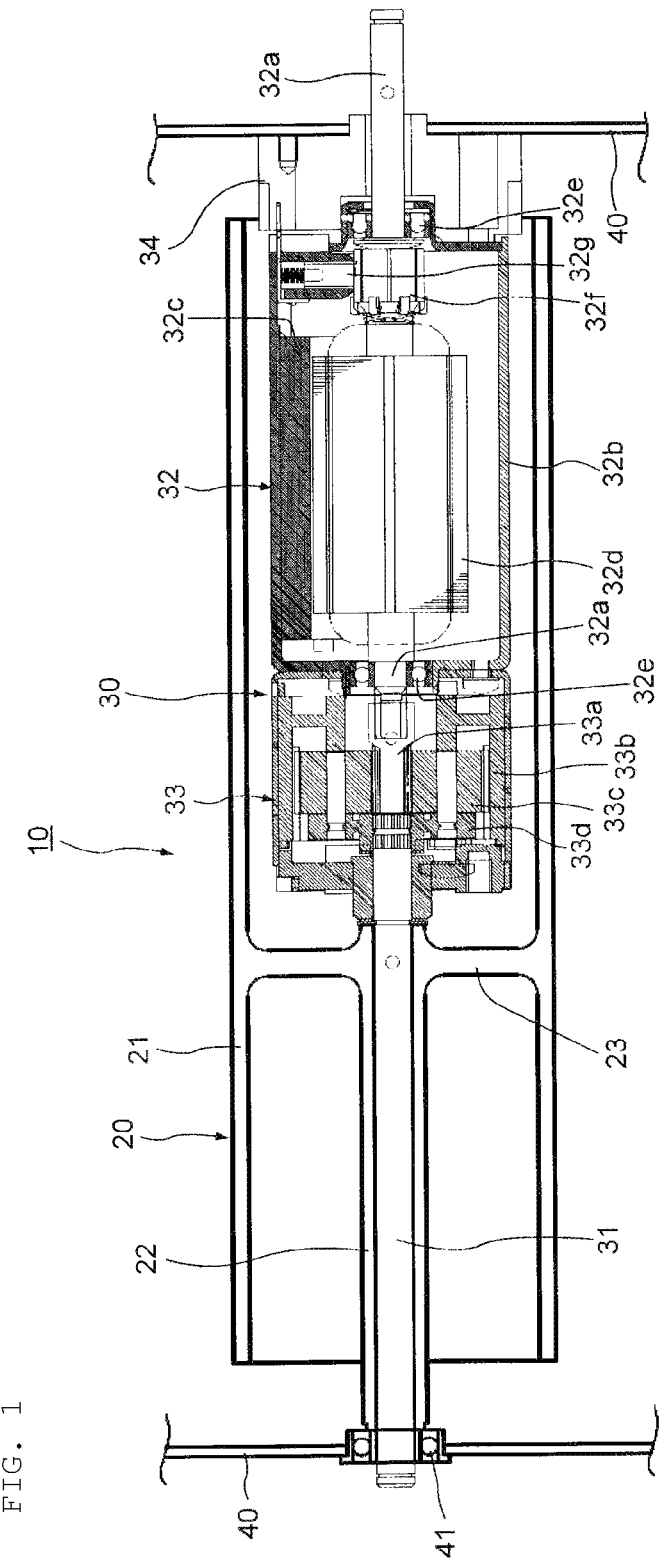
FIG. 1 shows a front, sectional view of a drum rotating device according to a preferred embodiment of the present invention.

The overall structure of a drum rotating device 10 according to the first preferred embodiment of the present invention is now described referring to FIG. 1. The drum rotating device 10 includes a drum 20 and a driving device 30 which can drive and rotate the drum 20.

The drum 20 is preferably formed of molded resin, for example, and includes an outer cylinder 21 and an inner cylinder 22 arranged inside the outer cylinder 21. The outer and inner cylinders 21 and 22 are substantially cylindrical and coaxial with each other. The drum 20 further includes a support wall 23 arranged to connect the outer and inner cylinders 21 and 22 to each other at an approximately intermediate portion in the axial direction of the drum 20. The inner cylinder 22 is provided only in the left half of FIG. 1 containing the support wall 23.

The driving device 30 is mounted in the drum 20 on the right side of the support wall 23 in FIG. 1. The driving device 30 is fixed to a frame 40 at one end (right end in FIG. 1) in the axial direction of the drum 20, while the driving shaft 31 of the driving device 30 extends through the drum 20 and is supported by the frame 40 through a bearing 41 at the other axial end (left end in FIG. 1) such that the driving shaft 31 can rotate freely. The driving shaft 31 is arranged to extend through the inner cylinder 22, thereby the drum 20 and the driving shaft 31 are fixedly attached to each other so that they can rotate together.

It is desirable that the support wall 23 of the drum 20 be located substantially at the center of the drum 20 in the axial direction. In this preferred embodiment, however, the support wall 23 is shifted from the axial center of the drum 20 to left in FIG. 1 in order to ensure adequate space for a motor 32 and a decelerator 33 within the drum 20. That positional shift of the support wall 23 from the axial center of the drum 20 may cause unstable drum operation, and therefore in order to prevent it, the inner cylinder 22 is provided inside the drum 20 and joined to the driving shaft 31. In this manner, displacement of the drum 20 with respect to the driving shaft 31 can be prevented and stable connection can be made.

The driving device 30 includes the motor 32 and the decelerator 33 which decelerates rotation of the motor 32 and transmits the decelerated rotation to the driving shaft 31. The decelerator 33 is arranged such that the rotation shaft 32a of the motor 32 as an input shaft and the driving shaft 31 as an output shaft are coaxial with each other. The rotation shaft 32a of the motor 32 is arranged to project through the frame 40 to the outside of the frame 40 at one end and is connected to the decelerator 33 at the other end.

Figure 2:
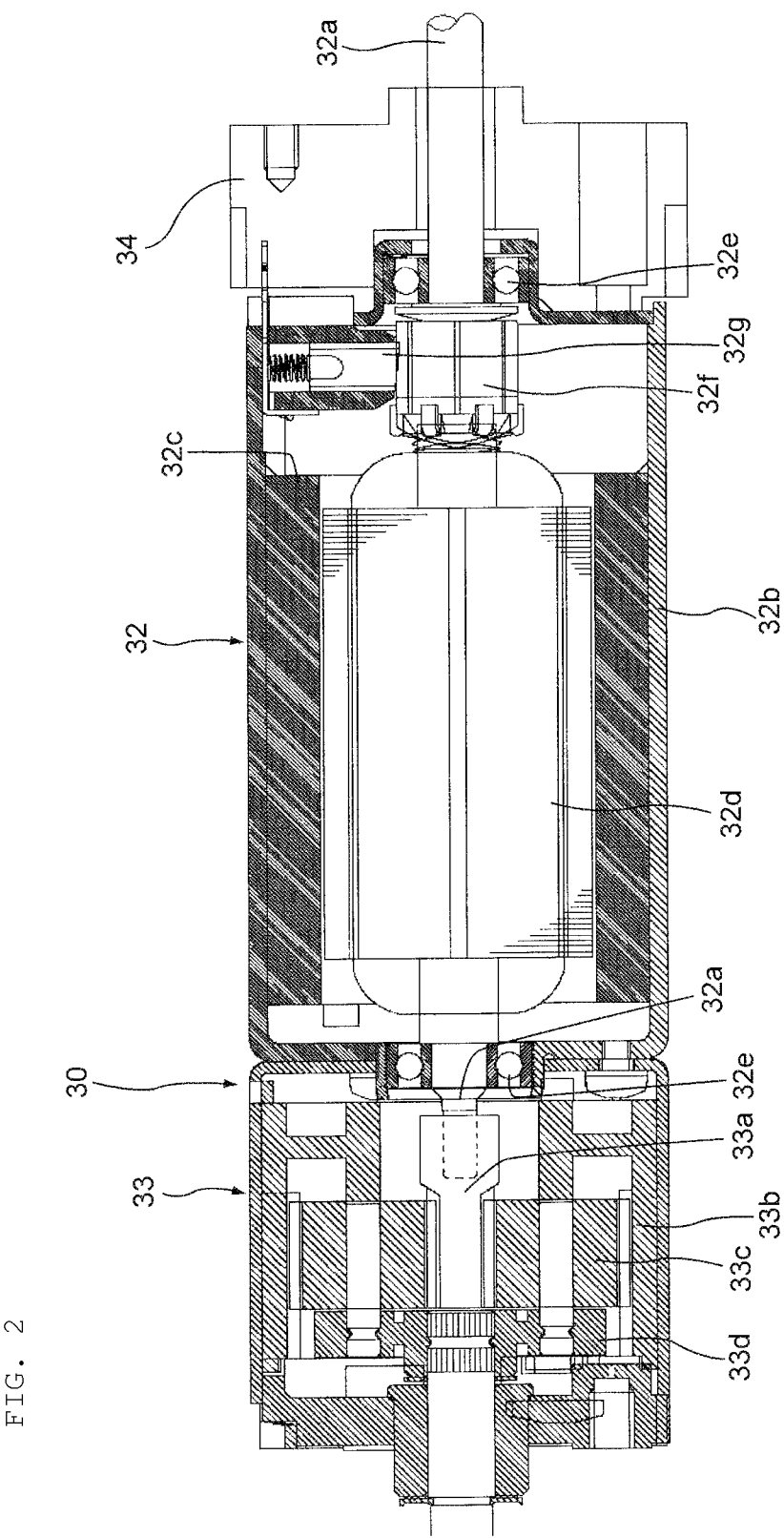
FIG. 2 shows an enlarged view of a motor of the drum rotating device of FIG. 1.
Figure 3:
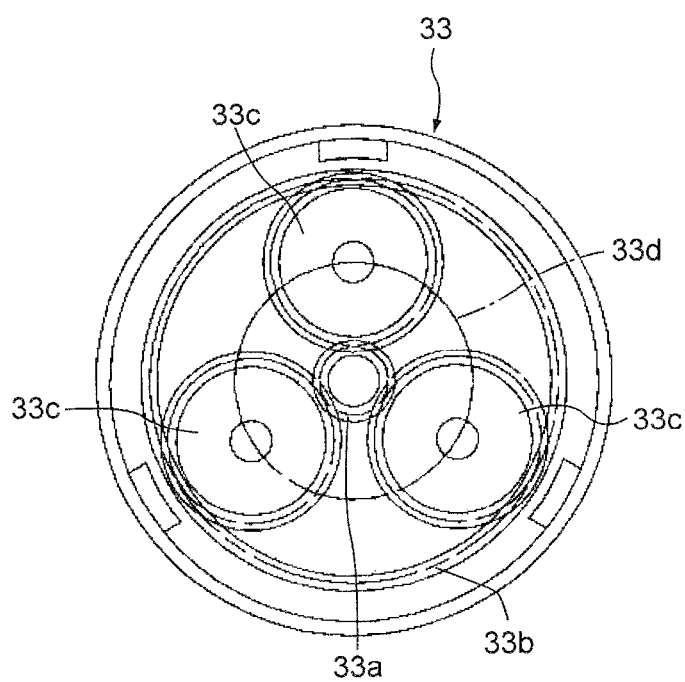
FIG. 3 shows a side view of a decelerator of the drum rotating device of FIG. 1.

Referring to FIGS. 1 and 2, the motor 32 is preferably a brush motor in this preferred embodiment, but brushless motors or any other desirable motor type could be used. The motor 32 preferably includes a tubular motor case 32b with bottoms, and a magnet 32c and an armature 32d both arranged in the motor case 32b. The magnet 32c is fixedly attached to the inside of the tubular portion of the motor case 32b. The armature 32d with windings wound therearound is arranged inside the magnet 32c. The armature 32d is rotatably supported by bearings 32e attached to both the bottoms of the motor case 32b. The armature 32d is provided near one of the bearings 32e with a commutator 32f which is connected to the windings. The motor case 32b is provided with a brush 32g which is arranged to be in contact with the commutator 32f to supply an electrical current to the windings to thereby generate electromagnetic flux which interacts with the magnet 32c to rotate the armature 32d and the shaft 32a connected thereto.

The motor 32 having the above-described structure is fixed to a holder 34 at one axial end, and the holder 34 is fixed to the frame 40. In this manner, the motor 32 is fixed to the frame 40. The decelerator 33 is fixed to the motor 32.

The decelerator 33 is defined by a planetary gear train with coaxial input and output axes, and includes a sun gear (outer gear) 33a joined to the rotation shaft 32a of the motor 32, a sun gear (inner gear) 33b fixed to the peripheral wall of the decelerator 33, three planetary gears 33c which mesh together with both the sun gears 33a and 33b, and a carrier 33d which links the rotation shafts of the three planetary gears 33c to one another. The carrier 33d is linked to the driving shaft 31 as the output shaft of the decelerator 33.

When the motor 32 rotates, this rotation is transmitted outside of the motor 32 by the rotation shaft 32a at one axial end to rotate the sun gear (outer gear) 33a of the decelerator 33 at the other axial end. The rotation of the sun gear (outer gear) 33a makes the three planetary gears 33c meshing together with both the sun gears 33a and 33b rotate and revolve so that the force of revolution of the three planetary gears 33c is transmitted to the driving shaft 31 through the carrier 33d. In this manner, the driving shaft 31 rotates at a reduced rate with respect to the rate of rotation of the shaft 32a of the motor 32. Because the drum 20 is fixedly attached to the driving shaft 31, it also rotates at the same reduced speed as the driving shaft 31.

According to the first preferred embodiment of the present invention, the driving device 30 is fixed to the frame 40 at one axial end, while the driving shaft 31 is rotatably supported by the frame 40 on the other axial end. Also, the drum 20 is fixedly attached to the driving shaft 31. Therefore, it is unnecessary to provide an independent supporting arrangement to support the drum 20 relative to the frame 40, and the drum 20 and the driving device 30 can be supported with a simple structure. In addition, since the drum 20 is fixedly attached to the driving shaft 31, it is unlikely that the driving shaft 31 and the rotation axis of the drum 20 will be offset or misaligned with respect to one another. Thus, by using this arrangement, the drum 20 can be stably rotated.

Moreover, the decelerator 33 is configured to be included in the driving device 30 in the first preferred embodiment of the present invention. Therefore, the drum 20 can be rotated with a small-torque motor. In addition, the rotation shaft 32a of the motor 32 and the driving shaft 31 are coaxial with each other in this preferred embodiment. Thus, the rotation axis of the motor 32 and that of the drum 20 can be made to coincide with each other such that the space within the drum 20 can be used effectively.

Furthermore, since the rotation shaft 32a of the motor 32 projects at one axial end through the frame 40 to the outside thereof, the power of the motor 32 can be used for additional purposes other than just for rotating the drum 20. Therefore, the space can be more effectively used than in a case where a separate motor is provided in the outside.

Second Preferred Embodiment

Figure 4:
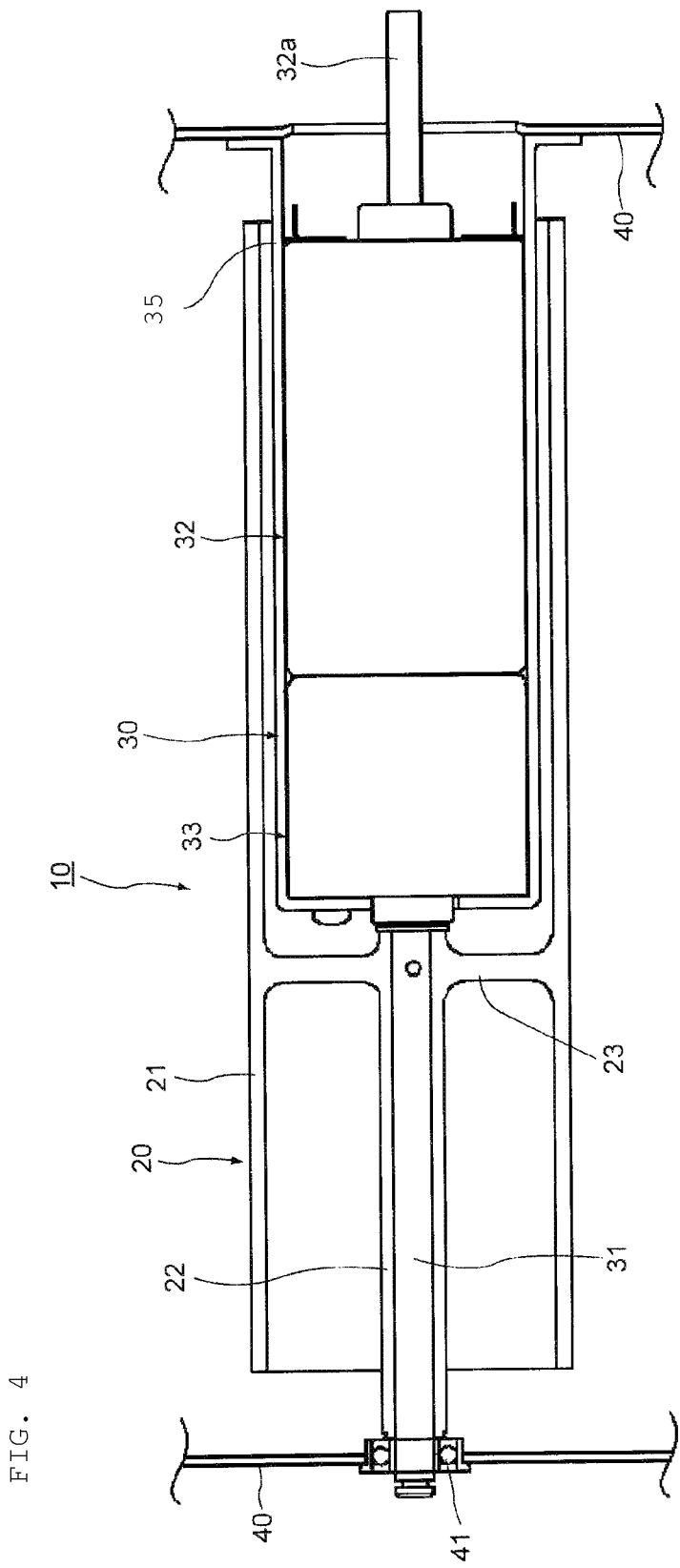
FIG. 4 shows a front, sectional view of a drum rotating device according another preferred embodiment of the present invention.

The second preferred embodiment of the present invention will now be described. FIG. 4 shows a front, sectional view of the drum rotating device of the second preferred embodiment. The structure of the drum rotating device in this preferred embodiment is basically the same as that in the first preferred embodiment, and therefore like reference numerals refer to like portions and repetitive description is omitted. The differences between the first and second preferred embodiments are mainly described below.

In the above-described first preferred embodiment, the holder 34 fixes the motor 32 to the frame 40, and the decelerator 33 is fixed to the motor 32. On the other hand, in the second preferred embodiment, a holding cylindrical portion 35, made from, for example, metal, is fixed to the frame 40, and the driving device 30 including the motor 32 and the decelerator 33 for decelerating the output of the motor 32 is placed and held inside the holding cylindrical portion 35.

The driving shaft 31 as the output shaft of the decelerator 33 is rotatably supported by the frame 40 through the bearing 41. The driving shaft 31 is arranged to extend through the inner cylinder 22 of the drum 20, thereby fixedly attached to the drum 20 so that they can rotate together. The structure of the motor 32 and the decelerator 33 which define the driving device 30 is preferably the same in that in the first preferred embodiment described above.

According to the structure of the second preferred embodiment, the same effects as those obtained in the first preferred embodiment can be obtained. Also, the motor 32 and the decelerator 33 defining the driving device 30 can be held and fixed by the holding cylindrical portion 35 as one unit. Therefore, the driving device 30 can be positioned more precisely than in the first preferred embodiment.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A drum rotating device comprising:
a drum arranged between a pair of oppositely positioned frame sidewalls; and
a driving device including a motor arranged to drive and rotate the drum, the driving device being mounted in the drum; wherein
the driving device is fixed to one of the frame sidewalls at one end in an axial direction of the drum;
a driving shaft of the driving device is arranged to extend through the drum to project from the drum to another one of the frame sidewalls at another end in the axial direction of the drum, a projected portion of the driving shaft being rotatably supported to the other of the frame sidewalls through a bearing;
the drum is fixedly attached to the driving shaft such that the drum is rotatable together with the driving shaft;
the driving device includes a decelerator arranged to decelerate a rotation speed of the motor and to transmit the decelerated rotation speed to the driving shaft;
a rotation shaft of the motor and the driving shaft are coaxial with each other; and
the rotation shaft of the motor extends in the axial direction, a first axial end of the rotation shaft projects through the frame to outside of the frame, and a second axial end of the rotation shaft is connected to the decelerator.

2. The drum rotating device according to claim 1, wherein the drum includes an outer cylinder, an inner cylinder arranged inside the outer cylinder coaxially therewith, and a support wall arranged to connect the outer cylinder and the inner cylinder to each other at an approximately intermediate position in the axial direction, the outer cylinder and the inner cylinder being substantially cylindrical; and
the driving shaft is arranged to extend through the inner cylinder so that the drum is fixedly attached to the driving shaft.

* * * * *